United States Patent [19]

Persson et al.

[11] Patent Number: 5,076,924
[45] Date of Patent: Dec. 31, 1991

[54] FILTER PLATE

[75] Inventors: Nils-Åke Persson, Malmö; Klas Ralvert, Karlshamn, both of Sweden

[73] Assignee: Hydrotech Nils-Ake Persson AB, Malmo, Sweden

[21] Appl. No.: 545,126

[22] Filed: Jun. 28, 1990

Related U.S. Application Data

[63] Continuation of Ser. No. 435,385, filed as PCT/SE88/00228, May 4, 1988, abandoned, which is a continuation of Ser. No. 343,806, Apr. 26, 1989, abandoned.

[30] Foreign Application Priority Data

May 4, 1987 [SE] Sweden .................... 8701820

[51] Int. Cl.$^5$ ............................. B01D 35/28
[52] U.S. Cl. .................... 210/474; 210/478; 210/489; 210/496; 210/499; 55/494; 55/DIG. 5
[58] Field of Search .......... 55/494, DIG. 5, DIG. 31; 210/474, 488, 489, 496, 499, 478, 227, 228

[56] References Cited

U.S. PATENT DOCUMENTS

| | | | |
|---|---|---|---|
| 3,651,947 | 3/1972 | Schouhamer | 210/474 |
| 3,724,671 | 3/1973 | Tate | 55/DIG. 31 X |
| 3,747,770 | 7/1973 | Zentis | 210/402 |
| 3,862,036 | 11/1975 | Simmons | 210/489 X |
| 4,038,187 | 7/1977 | Saffran | 210/108 |

FOREIGN PATENT DOCUMENTS 2107837 8/1971 United Kingdom .

OTHER PUBLICATIONS

A copy of International Search Report PCT.

Primary Examiner—Charles Hart
Attorney, Agent, or Firm—Merchant & Gould, Smith, Edell, Welter & Schmidt

[57] ABSTRACT

A filter plate (1) is described on which a filter cloth (4) is disposed across the whole top side and glued or welded to the outer sides, and which is used for filtering off particles from a liquid. The plate has a large number of apertures (2), each individual aperture area being at most 2.25 cm$^2$. The total free open area of the plate is 70-90% of the total plate area and the thickness of the plate is at least 5 mm.

10 Claims, 1 Drawing Sheet

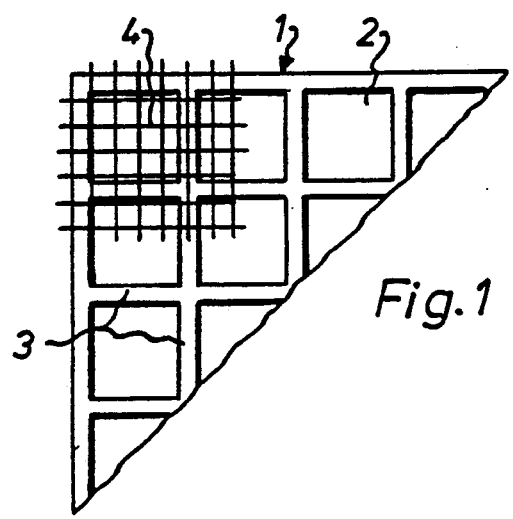
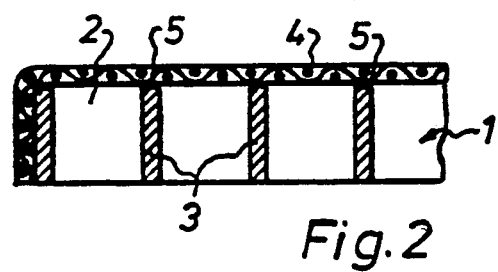

FILTER PLATE

This is a continuation of application Ser. No. 07/435,385, filed as PCT/SE88/00228, May 4, 1988 now abandoned which is a continuation of application Ser. No. 343,806, filed Apr. 26, 1989 and now abandoned.

The present invention relates to a filter plate on which a filter cloth is disposed and which is used for filtering off solid particles from a liquid.

Filter cloths are today employed in many different applications for separating solid particles from liquids, e.g. in water purification. The filter cloth is often disposed horizontally or freely suspended at an angle. A big problem in the context is the reduced flow capacity resulting from surface tensions present in the liquid phase and generated on the underside of the filter cloth. In order to break these surface tensions, ribs transversal to the flow direction are often mounted on the underside of the filter cloth. However, this measure does not solve the flow problem in a satisfactory manner. Another serious disadvantage of known filter systems is that the entire cloth must be replaced in case it is damaged, which is a complicated, time-wasting and expensive operation because the cloth is usually mounted in a frame.

In the present invention, the above-mentioned shortcomings have been obviated by means of an apertured filter plate on which a filter cloth is disposed. The filter cloth is attached to the underlying filter plate, preferably by gluing or welding, along essentially the whole contact surface of the filter cloth with the filter plate. If the filter cloth is damaged, the filter plate apertures coincident with the position of the damage on the cloth can easily be plugged, without necessitating replacement of the entire filter cloth. Such plugging of an aperture reduces the flow capacity by less than 1 per mil for each square meter of the filter surface.

Another advantage of the present invention is that the filter plate is easy to mount in a filtering apparatus since the filter plate and the filter cloth form an integral part.

The filter plate according to the present invention is characterised in that it has a large number of apertures, the area of each individual aperture being at most 2.25 cm$^2$, preferably at most 1 cm$^2$, that the total free open area of the plate is at least 70% of the total plate area, and that the thickness of the plate is at least 5 mm.

The filter plate according to the invention is mounted horizontally or preferably suspended at an angle. The flow of liquid to be filtrated is supplied to the filter plate from above and preferably at one of the edges of the filter plate when this is mounted at an angle, the liquid flow gradually urging the filtered-off sludge towards the opposite edge, at the same time as purified water flows out of the underside of the filter plate. When the filter cloth has become completely clogged, it is sprayed with water from below to clean it. The limited opening areas of the filter plate break the surface tensions on the underside of the filter cloth, whereby the flow is improved. For practical reasons, filter plates with an opening area of less than 0.25 cm$^2$ (5×5 mm) are not used.

Further characteristic features of the invention will appear from the following description and the dependent claims.

A critical feature of the invention is that the area of each aperture is at most 2.25 cm$^2$, preferably at most 1 cm$^2$. If this area is exceeded, it has in fact surprisingly been found that the flow capacity of the filter is drastically reduced, instead of being increased, as might have been expected. This is clearly shown by the comparison test described below.

In a preferred embodiment of the invention, the area of each aperture in the filter plate is most 1 cm$^2$, the plate has a thickness of 10 mm, the total free open area is about 80% of the total area, and the apertures are square-shaped with 9 mm sides and 1 mm wide partitions between the apertures.

DESCRIPTION OF THE DRAWINGS

FIG. 1 is a view from above of a portion of an embodiment of the filter plate according to the invention.
FIG. 2 is a side view of a portion of the filter plate illustrated in FIG. 1.

As is seen from FIG. 1, a filter plate 1 has a large number of square-shaped apertures 2 separated by partitions 3. The filter plate in its entirety is shaped as a rectangle having the dimensions 1200×400 mm, and several plate modules can be interconnected to a large assembly. A filter cloth 4 is glued or welded, at 5, across the entire contact surface with the filter plate, the glue or weld being applied to the contact surface on top of the partition walls 3 and the outer sides of the plate. The filter plate is manufactured of plastic material, preferably acrylic plastic, while the filter cloth is manufactured of steel, preferably acidproof steel. The filter cloth preferably has a mesh size of about 20–150 cm and an open area of about 25–50% of the total area. The thickness of the partitions 3 is 1 mm. The total free open area of the plate is about 80% of the total area.

Tests

In a comparison test involving the filtration of waste water from a fish-breeding plant, four different filter plate assemblies, each with the outer dimensions 2400×800 mm (4 interconnected filter plates), were used. The filter plate assemblies were referred to as A, B, C and D and had opening areas with the dimensions 9×9, 12×12, 15×15 and 19×19 mm, respectively. The width of the filter plate partitions was in all cases 1 mm, and the thickness of the plates appears from the table below. The mesh size of the filter cloth was 80 mm, and the cloth was flushed clean from below during 6 s at intervals of 40 s. The flow through each plate was recorded and is noted in the table below.

|  | opening area (cm$^2$) | plate thickness (mm) | flow (l/min) | relative flow |
| --- | --- | --- | --- | --- |
| filter plate assembly A | 0.81 | 10 | 1400 | 1 |
| filter plate assembly B | 1.44 | 13 | 1000 | 0.71 |
| filter plate assembly C | 2.25 | 15 | 700 | 0.50 |
| filter plate assembly D | 3.61 | 10 | 550 | 0.39 |

As is seen in the table above, the flow capacity of filter plate assembly B was only 71% of the flow capacity of assembly A. Furthermore, the flow capacities of assemblies C and D were only 50% and 39%, respectively, of the flow capacity of assembly A. This shows that a decrease of the opening area of the filter plate in this range results in a notable increase of the flow capacity, and this increase becomes especially evident when the opening area is at most 2.25 cm² (15×15 mm).

We claim:

1. Filter plate on which a filter cloth (4) is disposed and which is used for filtering off solid particles from a liquid, characterised in that the plate (1) has a large number of apertures (2), the area of each individual aperture being at most 2.25 cm²; that the total free open area of the plate is at least 70% of the total plate area; and that the thickness of the plate is at least 5 mm.

2. Filter plate according to claim 1, characterised in that the area of each aperture (2) in the plate (1) at most is 1 cm².

3. Filter plate according to claim 1, characterised in that the thickness of the plate (1) is 10 mm.

4. Filter plate according to claim 1, characterised in that the total free open area of the plate (1) is at most 90% of its total area.

5. Filter plate according to claim 1, characterised in that the total free open area of the plate (1) is 80% of the total plate area.

6. Filter plate according to claim 1, characterised in that the apertures (2) are square-shaped in section.

7. Filter plate according to claims 1, characterised in that the plate (1) is made of plastic material.

8. Filter plate according to claim 1, characterised in that the filter cloth (4) is glued or welded, at (5), to the filter plate (1).

9. Filter plate according to claim 1, characterised in that the filter cloth (4) has a mesh size of about 25-150 µm.

10. Filter plate according to claim 1, characterised in that the filter cloth (4) is made of steel.

UNITED STATES PATENT AND TRADEMARK OFFICE
CERTIFICATE OF CORRECTION

PATENT NO. : 5076924

DATED : 31 December 1991

INVENTOR(S) : Nils-Åke Persson, Klas Ralvert

It is certified that error appears in the above-identified patent and that said Letters Patent is hereby corrected as shown below:

Title page:
Under Related U.S. Application Data delete "which is a continuation of Ser. No. 343,806, Apr. 26, 1989, abandoned."

Signed and Sealed this

Sixth Day of July, 1993

Attest:

MICHAEL K. KIRK

Attesting Officer

Acting Commissioner of Patents and Trademarks